United States Patent
Brown et al.

(10) Patent No.: US 12,421,941 B2
(45) Date of Patent: Sep. 23, 2025

(54) ACTUATOR ASSEMBLY

(71) Applicant: CAMBRIDGE MECHATRONICS LIMITED, Cambridge (GB)

(72) Inventors: Andrew Benjamin Simpson Brown, Cambridge (GB); James Howarth, Cambridge (GB); Robin Eddington, Cambridge (GB); Stephen Matthew Bunting, Cambridge (GB); Oliver Hart, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 0 days.

(21) Appl. No.: 18/710,375

(22) PCT Filed: Nov. 15, 2022

(86) PCT No.: PCT/GB2022/052893
§ 371 (c)(1),
(2) Date: May 15, 2024

(87) PCT Pub. No.: WO2023/084251
PCT Pub. Date: May 19, 2023

(65) Prior Publication Data
US 2025/0020111 A1 Jan. 16, 2025

(30) Foreign Application Priority Data

Nov. 15, 2021 (GB) ...................... 2116400

(51) Int. Cl.
*F03G 7/06* (2006.01)
(52) U.S. Cl.
CPC ................. *F03G 7/06143* (2021.08)
(58) Field of Classification Search
CPC ...................................... H02N 11/00
See application file for complete search history.

(56) References Cited

U.S. PATENT DOCUMENTS

| 4,887,430 A | 12/1989 | Kroll et al. |
| 2008/0307786 A1 | 12/2008 | Hafez et al. |

(Continued)

FOREIGN PATENT DOCUMENTS

| EP | 0173433 A1 | 3/1986 |
| JP | 2011-027003 A | 2/2011 |
| WO | 2020/120997 A1 | 6/2020 |

OTHER PUBLICATIONS

Great Britain Search Report and Written Opinion received for GB Application No. 2116400.9, mailed on Mar. 31, 2022, 7 pages.

(Continued)

*Primary Examiner* — Shafiq Mian
(74) *Attorney, Agent, or Firm* — Van Hoven PC; Stefan D. Osterbur; Joshua Van Hoven

(57) ABSTRACT

An actuator assembly (1) comprising: a support structure (10) comprising a first friction surface (10f); a movable part (20) comprising a second friction surface (20f) engaging the first friction surface; one or more SMA wires (40) arranged, on contraction, to move the movable part relative to the support structure to any position within a range of movement; a biasing arrangement (30) arranged to bias the first and second friction surfaces against each other with a normal force, thereby generating a static frictional force that constrains the movement of the movable part relative to the support structure at any position within the range of movement when the one or more SMA wires are not contracted, wherein the one or more SMA wires are arranged such that the normal force between the first and second friction surfaces remains substantially constant on contraction of the one or more SMA wires.

20 Claims, 7 Drawing Sheets

(56) References Cited

U.S. PATENT DOCUMENTS

| | | |
|---|---|---|
| 2018/0321503 A1 | 11/2018 | Brown |
| 2019/0285829 A1 | 9/2019 | John et al. |
| 2020/0011305 A1 | 1/2020 | Yamauchi et al. |
| 2022/0059712 A1* | 2/2022 | Barbot .................... H02S 30/20 |

OTHER PUBLICATIONS

International Search Report and Written Opinion received for PCT Patent Application No. PCT/GB2022/052893, mailed on Jan. 25, 2023, 12 pages.

* cited by examiner

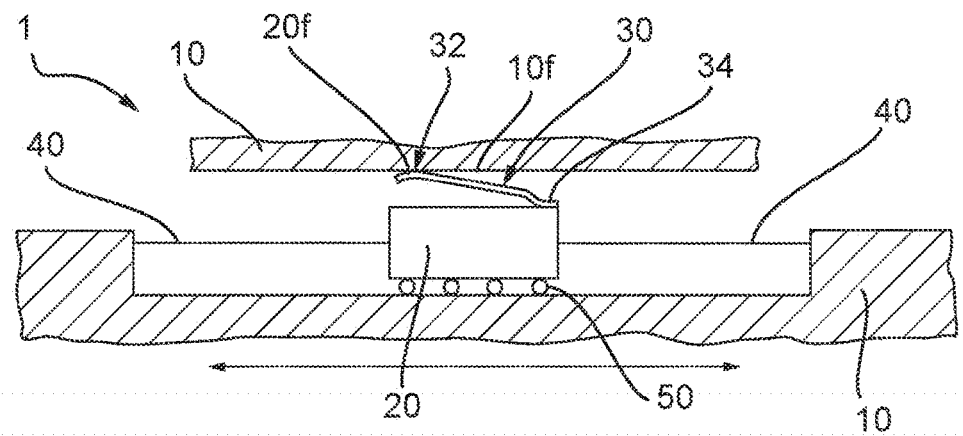
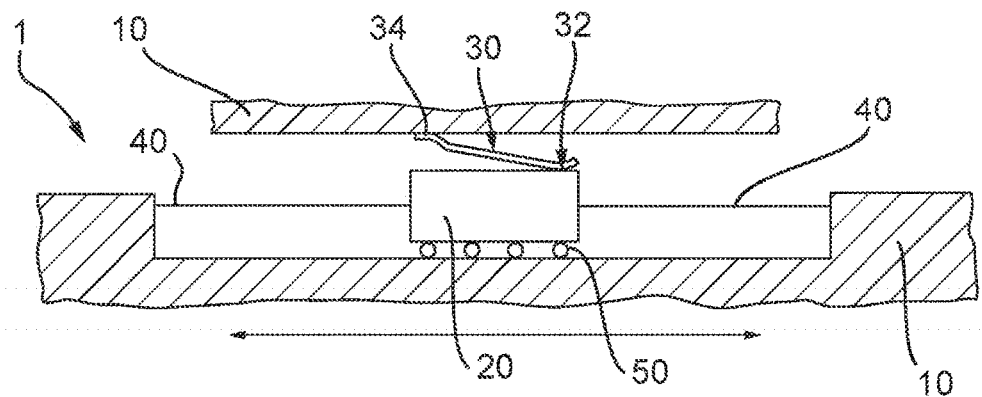
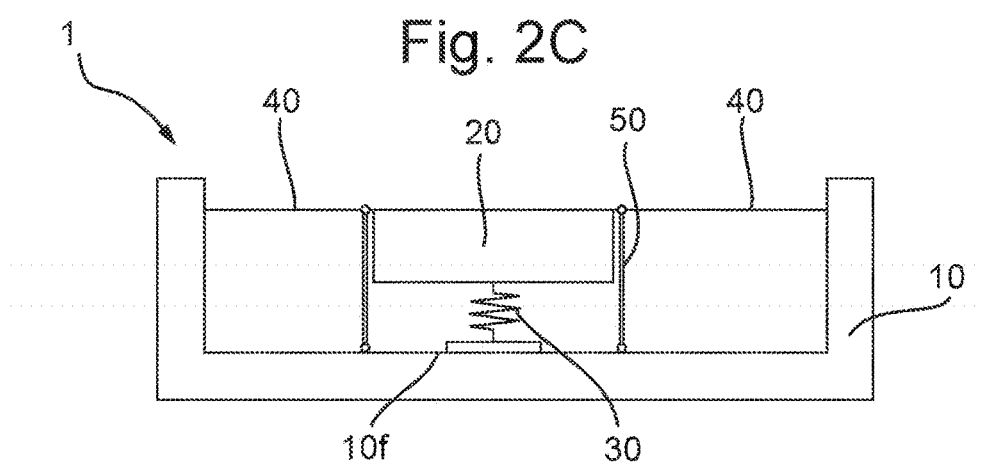

ACTUATOR ASSEMBLY

CROSS-REFERENCE TO RELATED APPLICATIONS

This application is a national stage application under 35 U.S.C. § 371 of International Application No. PCT/GB2022/052893, filed Nov. 15, 2022, which claims priority of GB Patent Application No. 2116400.9, filed Nov. 15, 2021, the disclosures of each of which are hereby incorporated by reference herein in their entireties.

FIELD

The present application generally relates to an actuator assembly, and in particular to a shape memory alloy (SMA) actuator assembly.

BACKGROUND

Shape memory alloy (SMA) actuators are used in camera assemblies for effecting a range of motions of a lens carriage or an image sensor. For example, WO 2013/175197 A1 describes a camera with an SMA actuator assembly in which SMA wires are configured to, on contraction, move the movable part in directions perpendicular to an optical axis to provide optical image stabilisation (OIS). This actuator assembly includes flexure arms that provide a lateral biasing force that biases a lens assembly towards a central position. However, in some cases where it is desirable to hold the lens assembly at a given position, such a known actuator assembly would have relied on continuously energising the SMA wires over a prolonged period of time. Such an arrangement not only consumes energy during the holding period, but the stability of the lens carriage may also be susceptible to sudden movements and other external factors.

WO2020/120997 A1 discloses various means for retaining a lens carriage at a given position by friction. In particular, a lens carriage is biased against a surface of a support structure by a biasing element to hold the lens carriage in any given position when the SMA wires are not energised. Upon actuation, the SMA wires act against the biasing element to reduce frictional forces, thereby enabling the lens carriage to be driven to a new position.

SUMMARY

The present invention provides various means for retaining a moveable part at the desired position when the SMA wires in an SMA actuator assembly are not energised, thereby eliminating the need for continuously energising the SMA actuator as required by known techniques.

According to the present invention, there is provided an actuator assembly comprising: a support structure comprising a first friction surface; a movable part comprising a second friction surface engaging the first friction surface; one or more shape memory alloy (SMA) wires arranged, on contraction, to move the movable part relative to the support structure to any position within a range of movement; a biasing arrangement arranged to bias the first and second friction surfaces against each other with a normal force, thereby generating a static frictional force that constrains the movement of the movable part relative to the support structure at any position within the range of movement when the one or more SMA wires are not contracted, wherein the one or more SMA wires are arranged such that the normal force between the first and second friction surfaces remains substantially constant on contraction of the one or more SMA wires.

The frictional force may thus maintain the position of the movable part, after having been moved into position by the SMA wires, without powering the SMA wires. This may reduce power consumption of the actuator assembly. The SMA wires do not affect the frictional surfaces, because stresses in the SMA wires do not contribute to the normal force between the friction surfaces. The inventors have surprisingly found that the SMA wires do not need to reduce the frictional force to overcome it. The constant frictional force may enable more controlled and reliable movement of the movable part by the SMA wires of the actuator assembly.

In some embodiments, the biasing arrangement is arranged to apply the biasing force in a direction perpendicular to the range of movement. For example, the movable part may be configured to move relative to the support structure in a plane or along an axis and the biasing arrangement may be arranged to apply the biasing force in a direction perpendicular to the plane or to the axis.

In some embodiments, the biasing arrangement is connected between the support structure and the movable part.

In some embodiments, the biasing arrangement is configured to move with the movable part relative to the support structure. The biasing arrangement may be connected to or integral with the movable part.

In some embodiments, the biasing arrangement is configured to remain static relative to the support structure as the movable part moves relative to the support structure. The biasing arrangement may be connected to or integral with the support structure.

In some embodiments, the biasing arrangement is comprised by the movable part or by the support structure, such that the biasing arrangement moves with the movable part relative to the support structure or remains static relative to the support structure.

In some embodiments, the movable part comprises two portions that are coupled (to each other) via the biasing arrangement. In some embodiments the support structure comprises two portions that are coupled (to each other) via the biasing arrangement.

In some embodiments, the biasing arrangement comprises one or more flexures.

In some embodiments, one or both of the first and second friction surfaces is formed integrally with the one or more flexures.

In some embodiments, the biasing arrangement comprises a magnet on one of the movable part and support structure, and a magnet or ferromagnetic material on the other of the movable part and support structure.

In some embodiments, the ratio of the static frictional force to the weight of the movable part is greater than 1, preferably greater than 3, further preferably greater than 5.

In some embodiments, wherein the static frictional force between the first and second friction surfaces is less than 50%, preferably less than 20%, further preferably less than 10% of the force generated by a stress of 200 MPa in the one or more SMA wires for moving the movable part relative to the support structure.

In some embodiments, the coefficient of static friction between the first and second friction surfaces is in the range between 0.05 and 0.6, preferably in the range between 0.1 and 0.4. In some embodiments, the coefficient of static friction between the first and second friction surfaces is in the range between 0.01 and 0.6, preferably in the range between 0.05 and 0.4.

In some embodiments, the coefficient of static friction between the first and second friction surfaces is substantially equal to the dynamic friction coefficient between the first and second friction surfaces.

In some embodiments, the actuator assembly comprises a bearing arrangement for bearing movement of the movable part relative to the support structure.

In some embodiments, the bearing arrangement constrains movement of the movable part relative to the support structure to movement in three degrees of freedom.

In some embodiments, the bearing arrangement constrains movement of the movable part relative to the support structure to movement in a movement plane.

In some embodiments, the bearing arrangement constrains movement of the movable part relative to the support structure to movement in one degree of freedom.

In some embodiments, the bearing arrangement constrains movement of the movable part relative to the support structure to helical movement about a helical axis.

In some embodiments, the bearing arrangement constrains movement of the movable part relative to the support structure to translational movement along a movement axis or rotational movement about a rotation axis.

In some embodiments, the bearing arrangement comprises a rolling bearing, the rolling bearing comprising a support bearing surface on the support structure, a movable bearing surface on the movable part and a rolling bearing element arranged between the support bearing surface and the movable bearing surface.

In some embodiments, the support bearing surface and movable bearing surface are parallel to the first and second friction surfaces.

In some embodiments, the bearing arrangement comprises a plain bearing formed between an engaging surface on the support structure in engagement with a corresponding engaging surface on the movable part.

In some embodiments, the plain bearing comprises a friction reducing coating or material on the support structure and/or movable part, or wherein the plain bearing comprises a friction reducing lubricant between the engaging surfaces.

In some embodiments, the plain bearing is formed between the first and second friction surfaces.

In some embodiments, the bearing arrangement is separate from the first and second friction surfaces.

In some embodiments, the one or more SMA wires are arranged, on contraction, to apply actuating forces to the movable part relative to the support structure that are parallel to the first and second friction surfaces.

In some embodiments, the one or more SMA wires are arranged parallel to the first and second friction surfaces.

In some embodiments, the one or more SMA wires comprise two or more SMA wires which are angled with respect to the first and second friction surfaces in equal and opposite ways, such that stresses in the two or more SMA wires perpendicular to the first and second friction surfaces cancel out and stresses in the two or more SMA wires parallel to the first and second friction surfaces move the movable part relative to the support structure.

In some embodiments, the one or more SMA wires are angled with respect to one or more directions of movement of the movable part relative to the support structure. Specifically, in some embodiments the one or more SMA wires may be arranged such that there is a non-zero, acute angle between the SMA wire(s) and the one or more directions of movement.

In some embodiments, one or both of the first and second friction surfaces is or are planar.

In some embodiments, the support structure and/or the movable part comprises a protrusion on which the first and/or second friction surface is formed.

In some embodiments, the biasing arrangement is integrally formed with one or more coupling elements that connect the ends of the one or more SMA wires to the movable part and/or support structure.

BRIEF DESCRIPTION OF THE DRAWINGS

Certain embodiments of the present invention will now be described, by way of example only, with reference to the accompanying drawings, in which:

FIGS. 2A, 2B and 2C are schematic side views of actuator assemblies according to embodiments of the present invention, comprising different bearing arrangements;

DETAILED DESCRIPTION

The present invention provides various means for retaining a movable part of an actuator assembly at a desired position when the SMA wires are not energised, thereby eliminating the need for continuously energising the SMA wires as required by known techniques.

Overview of the Actuator Assembly

Figure 1A:
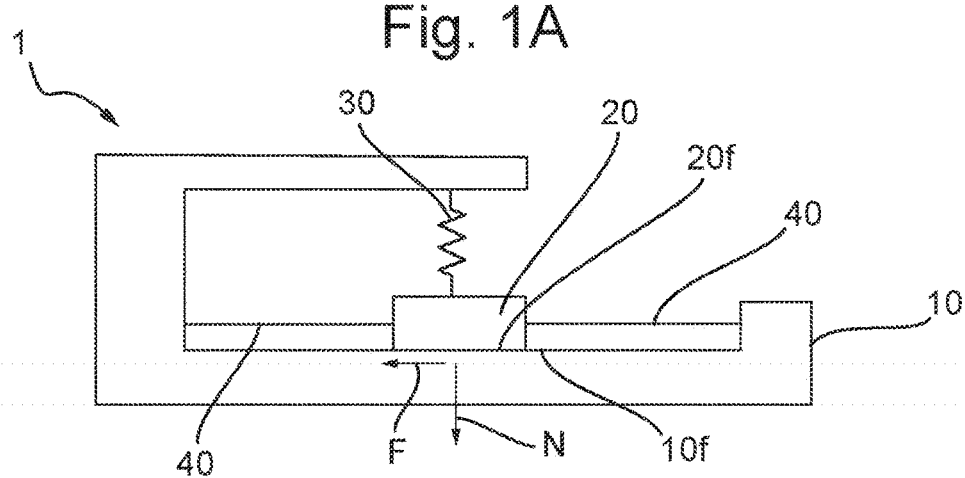
FIGS. 1A, 1B and 1C are schematic side views of actuator assemblies according to embodiments of the present invention, comprising different biasing arrangements.
Figure 1B:
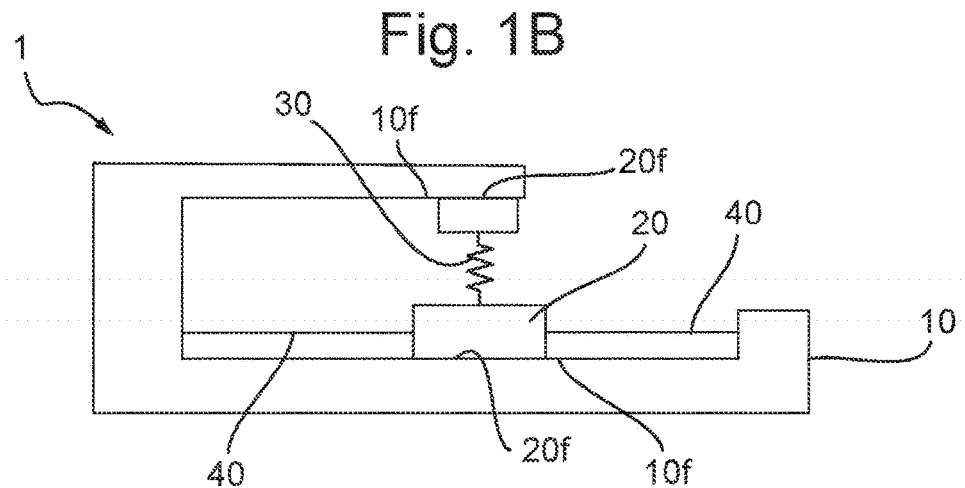
Figure 1C:
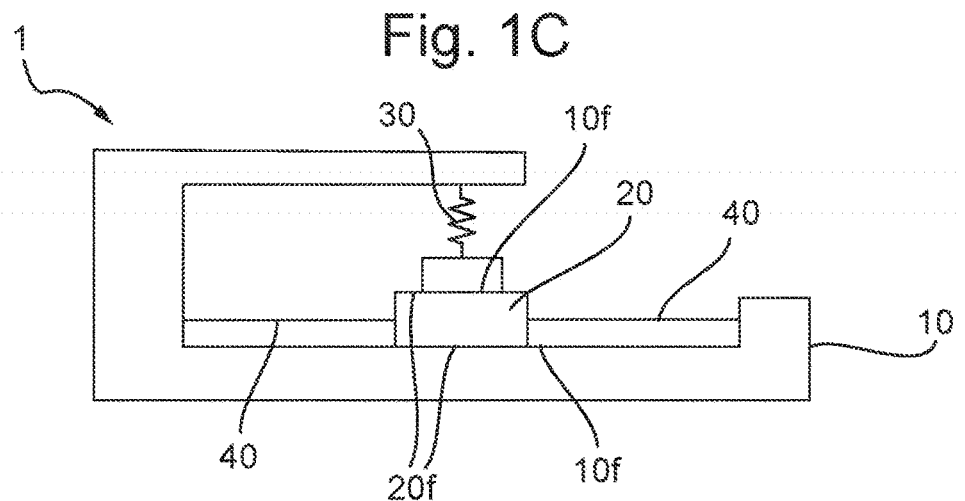

FIGS. 1A-C schematically depict an actuator assembly 1 according to an embodiment of the present invention.

The actuator assembly comprises a support structure 10 and a movable part 20. The movable part 20 is movable relative to the support structure 10. In general, the support structure 10 and the movable part 20 may be referred to as a first part and a second part respectively, and the terms support structure 10 and movable part 20 are used herein for purely illustrative purposes. In this regard, the support structure 10 is used herein as a reference structure. Movement of any components of the actuator assembly 1 is described relative to the support structure 10, unless otherwise indicated. However, in general the support structure 10 may itself be movable, for example within a larger device into which the actuator assembly 1 is incorporated. In some embodiments, the support structure 10 may be made up of components that are movable relative to each other.

The movable part 20 is movable relative to the support structure 10 within a range of movement. The range of movement may define movement in any number of degrees of freedom (DOF). Preferably, the range of movement defines movement in up to three DOFs, for example one, two or three DOFs. The movable part 20 may be movable relative to the support structure 10 in a movement plane within the range of movement, or along a movement axis within the range of movement, for example.

The actuator assembly 1 comprises one or more SMA wires 40. Preferably, the actuator assembly 2 comprises at least two SMA wires 40. The SMA wires 40 are arranged, on contraction, to move the movable part 20 relative to the support structure 10. The SMA wires 40 move the movable part 20 to any position within the range of movement. For example, the SMA wires 40 may move the movable part 20 in one DOF, in two DOFs or in three DOFs.

Each of the SMA wires 40 may be connected at one end to the support structure 10 by a corresponding coupling element (not shown) and at the other end to the movable part 20 by a corresponding coupling element (not shown). The coupling elements may be crimps, for example. The coupling elements may provide both mechanical and electrical connection to the SMA wires 40. The SMA wires 40 may each be electrically connected (via the coupling elements) to a control circuit (not shown) which may be implemented in an integrated circuit (IC) chip, for example. The control circuit in use applies drive signals to the SMA wires 40 which resistively heat the SMA wires 40, causing them to contract. The plural SMA wires 40 may be driven independently or otherwise. The control circuit may also measure the resistance of the SMA wires 40, and use the measured resistance to calculate/determine the position of the movable part 20. In general, however, the SMA wires 40 may be heated so as to contract by any other suitable means, such as via an external heat source, radiative heating or inductive heating.

In this regard, the range of movement comprises any movement of the movable part 20 relative to the support structure 10 that can be achieved by selective contraction of the arrangement of SMA wires 40. The range of movement may be defined as the movement achievable by selective contraction of the SMA wires 40. Optionally, the range of movement may be limited by endstops between the support structure 10 and the movable part 20, in particular when contraction of the SMA wires 40 causes an endstop between the support structure 10 and the movable part to engage. The range of movement may also be affected, at least in part, by a bearing arrangement defining the DOFs in which the movable part 20 may be moved.

The range of movement may thus be defined as the collection of locations and orientations to which the movable part 20 may be moved relative to the support structure 10 by the SMA wires 40. The range of movement may be affected by one or more of i) the arrangement of SMA wires 40 as well as control for driving the SMA wires 40, ii) the provision of endstops between movable part 20 and support structure 10 that limit the range of movement, iii) the provision of bearing arrangements that define the DOFs of movement of the movable part 20 relative to the support structure 10. In some embodiments, the range of movement may define movement of the movable part 20 relative to the support structure 10 in a movement plane (in 2 or 3 DOFs) or along a movement path (in 1 DOF).

Friction Surfaces for Zero Hold Power

The support structure 10 comprises a first friction surface 10$f$. The movable part 20 comprises a second friction surface 20$f$. The second friction surface 20$f$ of the movable part 20 engages the first friction surface 10$f$ of the support structure 10. The first and second friction surfaces 10$f$, 20$f$ may engage each other throughout the range of movement. So, in normal use (i.e. under contraction of the SMA wires 40 for moving the movable part 20), the first and second friction surfaces 10$f$, 20$f$ remain in engagement with one another.

The actuator assembly 1 further comprises a biasing arrangement 30. The biasing arrangement 30 is arranged to bias the first and second friction surfaces 10$f$, 20$f$ against each other. The biasing arrangement 30 applies a biasing force between the support structure 10 and the movable part 20. The biasing force comprises a component that is perpendicular to the first and second friction surfaces, and so the biasing arrangement 30 applies a normal force N between support structure 10 and movable part 20. The normal force N is perpendicular to the range of movement and perpendicular to the friction surfaces 10$f$, 20$f$. Preferably, the biasing arrangement 30 applies the biasing force in the direction perpendicular to the range of movement and perpendicular to the friction surfaces 10$f$, 20$f$. The biasing force of the biasing arrangement may be equal to the normal force N. So, the biasing force may not have a component parallel to the range of movement, and thus not affect movement of the movable part 20 relative to the support structure 10.

This normal force N generates or gives rise to a static frictional force F between the first and second friction surfaces 10$f$, 20$f$. The static frictional force F constrains movement of the movable part 20 relative to the support structure 20, in particular when the SMA wires 40 are not contracted. Such movement is constrained at any position and/or orientation within the range of movement of the movable part 20 relative to the support structure 10.

The SMA wires 40 may be used to move the movable part 20 to any position within the range of movement of the movable part 20 relative to the support structure 10. Upon energising (i.e. when drive signals are applied to the SMA wires by the control circuit), the SMA wires 40 contract and apply an actuating force for moving the movable part 20 in respective directions. The actuating force is sufficient to overcome the frictional forces at the friction surfaces 10$f$, 20$f$, in order to drive relative movement between the movable part 20 and the support structure 10. Upon ceasing power supply to the SMA wires 40, and so when stopping contraction of the SMA wires 40, the movable part 20 remains at its position within the range of movement due to the frictional forces between the first and second friction surfaces 10$f$, 20$f$. In this state, the movable part 20 is retained in position with zero power consumption by the actuator assembly 1, so the actuator assembly 1 may be referred to as a zero power hold actuator assembly, as may the other actuator assemblies disclosed herein. The movable part 20 is thus held in place without requiring power supply to the SMA wires 40, reducing the power consumption of the actuator assembly compared to a situation in which the SMA wires 40 need to be powered to hold the movable part in place.

The SMA wires 40 are arranged such that the normal force N between first and second friction surfaces 10$f$, 20$f$ remains substantially constant on contraction of the one or more SMA wires. Stresses in the SMA wires do not affect the normal force N. Put another way, the composite force acting on the movable part due to stresses in the SMA wires 40 does not have a component that is parallel to the normal force N, or such a component is negligible. The stresses in the SMA wires 40 do not (or only to a negligible extent) contribute to the normal force N. The normal force N remains substantially constant in that it varies by less than 5%, preferably less than 1%, due to forces arising from stresses in the SMA wires 40.

Such an arrangement in which the normal fore N is substantially unaffected by the SMA wires reduces variation in the frictional forces F between movable part 20 and support structure 10. This makes control of the movement of the movable part 20 by the SMA wires 40 simpler. The arrangement of SMA wires 40 may also be less complex compared to a situation in which stresses and/or strains in the SMA wires 40 affect the normal force N between the friction surfaces 10*f*, 20*f*.

Characteristics of the Frictional Forces

As described above, the normal force N generates or gives rise to a static frictional force F between the first and second friction surfaces 10*f*, 20*f*. The static frictional force F constrains movement of the movable part 20 relative to the support structure 10. The magnitude of the static frictional force F is thus large enough to constrain such movement. The magnitude of the static frictional force F is proportional to the normal force N and the coefficient of static friction u, such that $F=\mu *N$. The static frictional force F may be increased by increasing the normal force N, which is achieved by appropriate design of the biasing arrangement 30, and/or by increasing the coefficient of static friction, which is achieved by appropriate design of the friction surfaces 10*f*, 20*f*.

The magnitude of the static frictional force is great enough to constrain movement of the movable part. The ratio of the static frictional force to weight of the movable part may be greater than 1. So, the magnitude of the static frictional force is greater than the weight of the movable part. This ensures that movement of the movable part is constrained by the frictional force even when the actuator assembly 1 is turned on its side, for example. The weight of the movable part is considered to be equal to the mass of the movable part times earth's average gravitational acceleration (9.81 m/s$^2$). Preferably, the ratio of the static frictional force to the weight of the movable part is greater than 3, further preferably greater than 5. This ensures that movement of the movable part 20 is constrained even when the actuator assembly 1 accelerates. A larger ratio of static frictional force to weight of the movable part reduces the risk of movement of the movable part due to acceleration (e.g. impact events) of the actuator assembly 1. Higher frictional forces may also compensate for any lateral biasing forces of the biasing arrangement 30, for example when the biasing arrangement is connected between the support structure 10 and the movable part 20 (as in FIG. 1A).

The magnitude of the static frictional force is low enough to allow the SMA wires 40 to overcome the static frictional force so as to move the movable part 20 relative to the support structure 10. So, the magnitude of the static frictional force is less than the force applied to the movable part 20 by the SMA wires 40. The static frictional force may be less than 50%, preferably less than 20%, further preferably less than 10% of the force generated by a stress of 200 MPa in the SMA wires 40 for moving the movable part 20 relative to the support structure 10.

The coefficient of static friction between the first and second friction surfaces 10*f*, 20*f* directly affects the magnitude of the static frictional force F. The coefficient of static friction may be modified by appropriately processing or selecting the material of the first and second friction surfaces 10*f*, 20*f*. The coefficient of static friction may be in the range between 0.05 and 0.6. Preferably, the coefficient of static friction is in the range between 0.1 and 0.4. The coefficient of static friction between the first and second friction surfaces may be in the range between 0.01 and 0.6, preferably in the range between 0.05 and 0.4. In general, lower coefficients of static friction can be compensated for by higher normal forces N imparted by the biasing arrangement 30.

The requirements for the static frictional forces F between first and second friction surfaces 10*f*, 20*f* have been described above. These requirements may ensure that the movable part 20 remains in place relative to the support structure 10 once in position. Preferably, the same requirements apply to the dynamic or kinetic frictional forces between first and second friction surfaces 10*f*, 20*f*, thus ensuring that the movable part 20 rapidly comes to rest after being moved by the SMA wires 40. For this purpose, the ratio of the dynamic frictional force to weight of the movable part, the relation between dynamic frictional force and forces due to the SMA wires 40, and the coefficient of dynamic friction between the first and second friction surfaces 10*f*, 20*f* may be as described in relation to the static frictional force F. Preferably, the static friction coefficient between the first and second friction surfaces 10*f*, 20*f* is substantially equal (e.g. varying by less than 5%, preferably less than 1%) to the dynamic friction coefficient between the first and second friction surfaces 10*f*, 20*f*. This makes the forces acting on the movable part more predictable, reducing the complexity of movement control.

Biasing Arrangements

FIGS. 1A-C show different embodiments of the actuator assembly 1. These embodiments differ solely in the arrangement of the biasing arrangement 30.

In FIG. 1A, the biasing arrangement 30 is connected between the support structure 10 and the movable part 20. One end of the biasing arrangement 30 is connected to the support structure 10, and the other end of the biasing arrangement 30 is connected to the movable part 20. The one end connected to the support structure 10 remains static relative to the support structure 10 upon movement of the movable part 20, whereas the other end connected to the movable part 20 moves with the movable part 20. Such a biasing arrangement 30 may be simple to make compared to other biasing arrangements 30. Such a biasing arrangement 30 may also be relatively compact.

FIG. 1B schematically depicts another embodiment of the present invention, in which the biasing arrangement 30 forms part of the movable part 20. The movable part 20 comprises the biasing arrangement 30. The biasing arrangement 30 moves with the movable part 20 relative to the support structure. In such an arrangement, it is easier to ensure that the biasing force of the biasing arrangement 30 acts in a direction perpendicular to the range of movement.

The movable part 20 may thus be considered to comprise two portions that are coupled via the biasing arrangement 30. One of the two portions may be formed integrally with the biasing arrangement, as for example depicted in FIG. 2A. The movable part 20 may be sandwiched between two opposing surfaces of the support structure 10, i.e. between two surfaces of the support structure 10 that face each another.

FIG. 1C schematically depicts another embodiment of the present invention, in which the biasing arrangement 30 forms part of the support structure 10. The support structure 10 comprises the biasing arrangement 30. The biasing arrangement 30 remains static relative to the support structure 10, i.e. no part of the biasing arrangement 30 moves upon movement of the movable part 20. In such an arrangement, it is easier to ensure that the biasing force of the biasing arrangement 30 acts in a direction perpendicular to the range of movement.

The support structure 10 may thus be considered to comprise two portions that are coupled via the biasing arrangement 30. One of the two portions may be formed integrally with the biasing arrangement, as for example depicted in FIG. 2B. The movable part 20 may be sandwiched between the two portions of the support structure 10.

As shown in the embodiments of FIGS. 1B and 1C, the support structure 10 may comprise multiple separated first friction surfaces 10f and the movable part 20 may comprise multiple separated second friction surfaces 20f. The normal forces N acting between each of these friction surfaces may remain substantially constant upon contraction of the SMA wires 40. In general, multiple separated first and/or second friction surfaces 10f, 20f may be provided in any embodiment of the present invention and are not limited to being provided in embodiments in which the biasing arrangement 30 is comprised by the movable part 20 or support structure 10. The multiple separated friction surfaces may be provided in different planes (as in FIGS. 1B and C), for example, or may be provided in the same plane. The support structure and/or the movable part may comprise one or more protrusions on which the first and/or second friction surface 10f, 20f is formed, which allows the area of contact between first and second friction surfaces 10f, 20f to be defined. Furthermore, embodiments in which the biasing arrangement 30 is comprised by the movable part 20 or support structure 10 do not necessarily comprise multiple separated first and second friction surfaces 10f, 20f, but may comprise only a single first and/or second friction surface 10f, 20f.

In general, even though the biasing arrangement 30 is schematically depicted as a spring element in FIGS. 1A-C, the biasing arrangement 30 may comprise any component capable of applying a biasing force between movable part 20 and support structure 10. The biasing arrangement 30 may, for example, comprise a resilient element such as a flexure, a coil spring, a leaf spring, an elastomer, or any other suitable biasing element such a pair of a magnet and a ferromagnetic element.

In arrangements in which the biasing arrangement 30 comprises a resilient element, the resilient element (e.g. the flexure) is preferably compliant (or only compliant) in at least a direction orthogonal to the friction surfaces 10f, 20f. The resilient element (e.g. the flexure) may also be compliant in other directions other than the one normal to the surface, particularly in embodiments in which the biasing arrangement is connected between movable part 20 and support structure 10.

Even though the biasing arrangement 30 is schematically depicted as being arranged between the support structure 10 and the movable part 20 in a direction along the normal force N, in practice the biasing arrangement 30 may be arranged in a lateral direction, i.e. in a direction from a side of the movable part 20 and to a side of the support structure 10. A flexure or leaf spring may, for example, generally extend in a direction parallel to the frictional force F while applying a normal force N to the movable part 20. This may provide a more compact actuator assembly.

FIGS. 2A-B schematically show some examples of the biasing arrangement 30. The biasing arrangement 30 of FIG. 2A corresponds in essence to that schematically depicted in FIG. 1B, in that the biasing arrangement 30 is comprised by (forms part of) the movable part 20. The biasing arrangement comprises a flexure. One end 34 of the flexure is connected to the movable part 20, i.e. is fixed relative to the movable part 20. The other end 32 of the flexure engages with the support structure 10 but is not connected to the support structure 10, so as to provide the second friction surface 20f. The second friction surface 20f is formed integrally with the flexure. A surface of the flexure forms the second friction surface 20f.

The biasing arrangement 30 of FIG. 2B corresponds in essence to that schematically depicted in FIG. 1C, in that the biasing arrangement 30 is comprised by (forms part of) the support structure 10. The biasing arrangement comprises a flexure. One end 34 of the flexure is connected to the support structure 10, i.e. is fixed relative to the support structure 10. The other end 32 of the flexure engages with the movable part 20 but is not connected to the movable part 20, so as to provide the first friction surface 10f. The first friction surface 10f is formed integrally with the flexure. A surface of the flexure forms the first friction surface 10f.

Although not shown, in some embodiments the biasing arrangement 30 is a magnetic biasing arrangement. The magnetic biasing arrangement provides a magnetic biasing force for biasing the first friction surface against the second friction surface. The magnetic biasing arrangement comprises a magnet (preferably a permanent magnet) on one of the movable part 20 and support structure 10, and a magnet (preferably a permanent magnet) or ferromagnetic material on the other of the movable part 20 and support structure 10. The biasing force of the biasing arrangement 30 corresponds to the magnetic force between the magnetic components. The first and second friction surfaces may be surfaces of the magnets or ferromagnetic material.

The biasing arrangement 30 may comprise plural biasing elements that work in concert to provide the biasing force. So, the biasing arrangement 30 may comprise any combination of the biasing arrangements described above.

Bearing Arrangements

In FIGS. 1A-C, the friction surfaces 10f, 20f act as a bearing arrangement between support structure 10 and movable part 20. So, the friction surfaces 10f, 20f support the movable part 20 on the support structure 10 and bear movement of the movable part 20 relative to the support structure 10.

In general, however, a bearing arrangement 50 may be provided independently from the friction surfaces 10f, 20f. Embodiments of this are shown in FIGS. 2A and 2B, for example. Similarly, one of the pairs of friction surfaces 10f, 20f of the embodiments of FIG. 1B or 1C may be replaced with a bearing arrangement 50. Providing the bearing arrangement 50 independently from the friction surfaces 10f, 20f may make it easier to maintain a constant normal force N, because the bearing arrangement 50 can absorb variations in the forces applied by the SMA wires 40 on the movable part 20.

Except where the context requires otherwise, the term "bearing" is used herein as follows. The term "bearing" is used herein to encompass the terms "sliding bearing" or "plain bearing", "rolling bearing" (including "ball bearing" or "roller bearing") and "flexure bearing". The term "bearing" is used herein to generally mean any element or combination of elements that functions to constrain motion to only the desired motion. The term "sliding bearing" is used to mean a bearing in which a bearing element slides on a bearing surface, and includes a "plain bearing". The term "rolling bearing" is used to mean a bearing in which a rolling bearing element, for example a ball or roller, rolls on a bearing surface. In embodiments, the bearing may be provided on, or may comprise, non-linear bearing surfaces. In some embodiments, more than one type of bearing arrangement may be used in combination to provide the bearing functionality. Accordingly, the term "bearing" used herein includes any combination of, for example, plain bearings, rolling bearings and flexure bearings.

In FIGS. 2A and 2B, for example, the bearing arrangement 50 comprises a rolling bearing. A rolling bearing is a roller bearing or a ball bearing, for example. The rolling bearing comprising a support bearing surface on the support structure 10, a movable bearing surface on the movable part 20 and a rolling bearing element (such as a roller or ball) arranged between the support bearing surface and the movable bearing surface. In some embodiments, for example in embodiments in which the range of movement is defined in a movement plane, the support bearing surface and movable bearing surface are parallel to the first and second friction surfaces 10f, 20f.

In alternative embodiments, the bearing arrangement 50 comprises a plain bearing or sliding bearing. The plain bearing is formed between an engaging surface on the support structure that is in engagement with a corresponding engaging surface on the movable part 20. The plain bearing may be considered to be separate from the friction surfaces 10f, 20f for example in instances in which the friction coefficients in the plain bearing are lower, e.g. significantly lower (e.g. less than 50%, or less than 90%), than the friction coefficients between the first and second friction surfaces 10f, 20f. For this purpose, the plain bearing may comprise a friction reducing coating or material on the support structure 10 and/or movable part 20, or a friction reducing lubricant between the engaging surfaces. Such plain bearings may, for example, comprising a polymer or a polymer coating. The coefficient of static friction between the engaging surfaces of the plain bearing may be less than 5 times, preferably less than 10 times, of the coefficient of static friction between the first and second friction surfaces 10f, 20f.

FIG. 2C schematically shows an alternative embodiment in which the bearing arrangement 50 comprises a flexure bearing. The flexure bearing comprises one or more flexures, the flexures resisting deformation along their longitudinal extent and being relatively deformable lateral to their longitudinal extent. In the embodiment of FIG. 2C, the flexures of the bearing arrangement 50 are held in tension, at least partly due to the biasing force of the biasing arrangement 30. The flexures allow movement of the movable part 20 within the range of movement (e.g. in the left-right direction in FIG. 2C), but constrain movement outside the range of movement (e.g. in the up-down direction in FIG. 2C).

In general, the actuator assembly 1 comprises a bearing arrangement 50 for bearing movement of the movable part 20 relative to the support structure 10. The bearing arrangement 50 may be separate from the first and second friction surfaces 10f, 20f (as in FIGS. 2A-C). Alternatively, the bearing arrangement 50 may, at least in part, be formed from the first and second friction surfaces 10f, 20f (as in FIGS. 1A-C).

The bearing arrangement 50 constrains movement of the movable part 20 to movement within the range of movement. The bearing arrangement 50 may constrain movement of the movable part 20 relative to the support structure 10 to movement in three degrees of freedom. For example, the bearing arrangement 50 may constrain movement of the movable part relative to the support structure to movement in a movement plane. The movement may comprise three DOFs, for example i) translation in a first direction in the movement plane, ii) translation in a second direction in the movement plane, perpendicular to the first direction, and iii) rotation in the movement plane. Alternatively, the movement may comprise two DOFs, for example i) translation in a first direction in the movement plane, ii) translation in a second direction in the movement plane, perpendicular to the first direction. This may allow the actuator assembly to be used in applications requiring such 3 DOF or 2DOF movement, for example as an optical image stabilization (OIS) actuator assembly implementing sensor shift OIS or lens shift OIS.

In other embodiments, the bearing arrangement 50 may constrain movement of the movable part 20 relative to the support structure 10 to movement in one degree of freedom. This may allow the actuator assembly to be used in applications requiring such 1 DOF movement, for example as an autofocus (AF) actuator assembly. An actuator assembly with 1 DOF of movement may be simpler to manufacture and control compared to an actuator assembly with more DOFs. For example, the bearing arrangement 50 may constrain movement of the movable part relative to the support structure to helical movement about a helical axis. Alternatively, the bearing arrangement may constrain movement of the movable part 20 relative to the support structure 10 to translational movement along a movement axis. Further alternatively, the bearing arrangement 50 may constrain movement of the movable part 20 relative to the support structure 10 to rotational movement about a rotation axis.

The first and second friction surfaces 10f, 20f may be arranged to allow movement of the movable part 20 relative to the support structure 10 in the DOFs allowed by the bearing arrangement 50. For example, one or both of the first and second friction surfaces 10f, 20f is or are planar. This may allow movement in up to 3 DOFs. In embodiments in which movement in one DOF is allowed, one of the first and second friction surfaces 10f, 20f may be provided on a protrusion and the other of the first and second friction surfaces 10f, 20f may be provided on a guide channel shaped complementary to the protrusion. The range of movement of the movable part 20 relative to the support structure 10 may thus comprise movement along a line parallel to the guide channel.

SMA Wire Arrangements

In FIGS. 1A-C and FIGS. 2A-C, the SMA wires 40 are arranged parallel to the range of movement and parallel to the friction surfaces 10f, 20f. This is one way to ensure that strains and/or stresses in the SMA wires 40 do not affect the normal force N. Such an arrangement of SMA wires 40 provides a relatively simple manner of reducing and/or avoiding a contribution of the SMA wire stresses and/or strains on the normal force N.

Figure 3A:
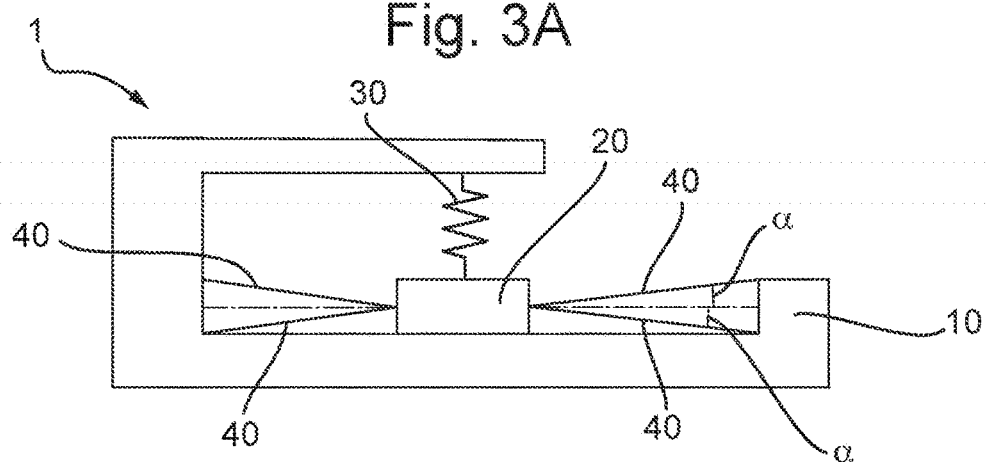
FIGS. 3A, 3B and 3C are schematic side views of actuator assemblies according to embodiments of the present invention, comprising different arrangements of SMA wires.
Figure 3B:
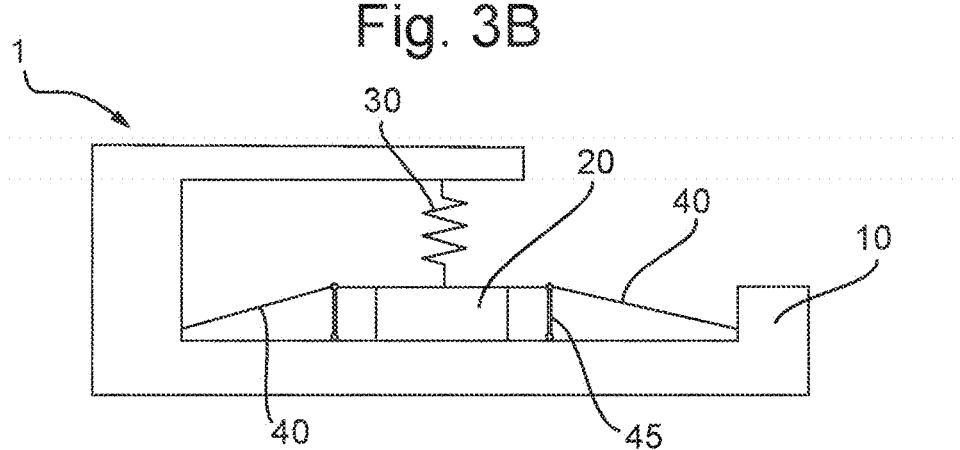
Figure 3C:
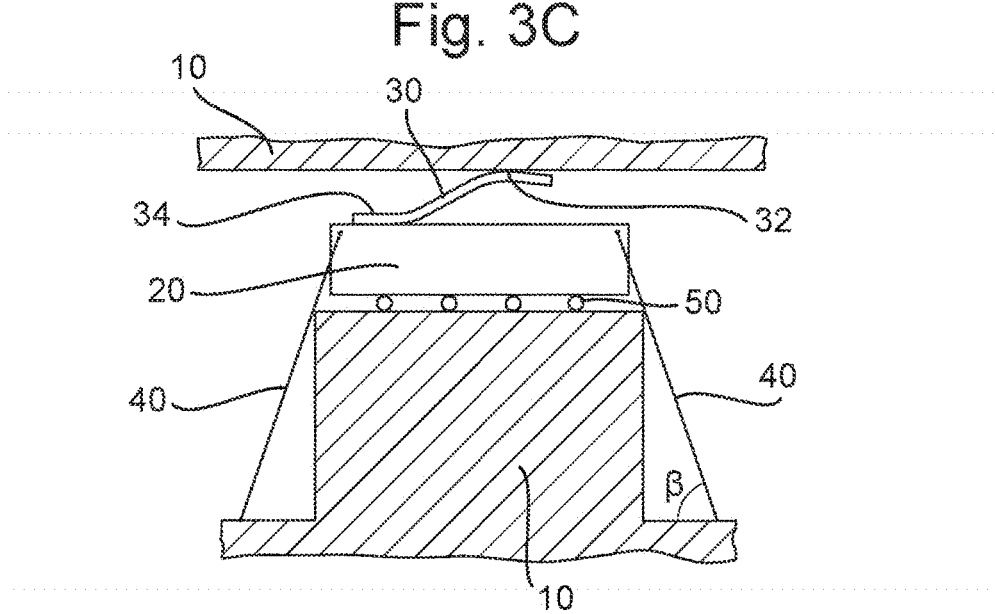

The one or more SMA wires 40 may be arranged, on contraction, to apply actuating forces to the movable part 20 relative to the support structure 10 that are parallel to the first and second friction surfaces 10f, 20f. Arranging the SMA wires 40 parallel to the first and second friction surfaces 10f, 20f is just one way to achieve this. FIGS. 3A and 3B depict alternative arrangements in which the actuating forces acting on the movable part 20 are parallel to the first and second friction surfaces 10f, 20f, even though the SMA wires 40 are not arranged parallel to the first and second friction surfaces 10f, 20f. FIG. 3C depicts a further alternative arrangement in which the actuating forces on the movable part 20 are not parallel to the first and second friction surfaces 10f, 20f, but the normal force N on the friction surfaces 10f, 20f is unaffected by the actuating force.

It will be appreciated that the SMA wire arrangement of FIGS. 3A-C may be combined with any of the biasing arrangements 30 and bearing arrangements 50 described herein.

In FIG. 3A, the SMA wires 40 are angled (e.g. arranged at an angle α) with respect to the first and second friction surfaces 10f, 20f in equal and opposite ways. The SMA wires 40 are arranged in pairs, such that the stress in one SMA wire of the pair of SMA wires in a direction normal to the friction surfaces is cancelled out by the stress in the other SMA wire of the pair of SMA wires. One SMA wire 40 of each pair of SMA wires comprises a component parallel to the normal force N (e.g. in an upward direction), and the other SMA wire 40 of each pair of SMA wires comprises a component parallel to the normal force N but of opposite direction (e.g. in a downward direction). As such, the composite force of the SMA wires in each pair of SMA wires does not comprise a component parallel to the normal force N. So, the stresses and/or strains in the SMA wires 40 do not affect the normal force N. The stresses in the pair of SMA wires in a direction parallel to the friction surfaces add up to overcome the frictional force F and move the movable part 20.

In FIG. 3B, the SMA wires 40 are arranged at an angle relative to the range of movement. Here, a force-modifying mechanism 45 is arranged between SMA wire 40 and movable part 20. The force-modifying mechanism 45 redirects the stress in an SMA wire 40 (which acts at an angle to the normal force N) to act on the movable part in a direction perpendicular to the normal force N. As such, the stresses and/or strains in the SMA wires 40 do not affect the normal force N.

In FIG. 3C, the SMA wires 40 are arranged at an angle β to relative to the range of movement and/or relative to the friction surfaces 10f, 20f. In FIG. 3C, a bearing arrangement 50 is provided separately from the friction surfaces 10f, 20f. The contribution of the SMA wire forces in a direction parallel to the normal force N is absorbed by the bearing arrangement 50. The SMA wires 40 in the embodiment of FIG. 3C thus act to bias the bearing arrangement 50. The normal force N is not affected by the stresses and/or strains in the SMA wires 40. Such an arrangement of SMA wires 40 may be preferable to arranging the SMA wires 40 parallel to the friction surfaces 10f, 20f, because slight variations in the orientation of the SMA wires 40 (due to manufacturing tolerances, for example) do not affect the normal force N.

In the depicted embodiment of FIG. 3C, the movable part 20 is provided on a raised platform of the support structure 10. This is not necessary in general, and the SMA wires 40 may be angled relative to the range of movement without provision of such a raised platform.

Providing the SMA wires 40 at an angle to the range of movement may achieve stroke amplification. Upon contraction of an SMA wire 40, the SMA wire may rotate about the end connected to the support structure, thereby increasing the displacement of the movable part 20 in the direction of movement. With reference to FIG. 3C, for example, a relatively small strain in one of the SMA wires 40 may give rise to relatively large lateral movement of the movable part 20 in the left-right direction.

Although not shown, such stroke amplification may also be achieved by keeping the SMA wires 40 parallel to the friction surfaces 10f, 20f, but angling the SMA wires 40 relative to a movement axis along which the movable part 10 may move. With reference to FIGS. 1A-1C, for example, the SMA wires 40 may be angled into and/or out of the page. If movement of the movable part 10 is constrained along a movement axis (e.g. in the left-right direction), stroke amplification is achieved.

Applications of Actuator Assembly

The actuator assembly 1 may generally be applied in any application in which it is desired to move a movable part 20 within a range of movement using SMA wires 40, and to keep the movable part 20 in place at any position within the range of movement upon ceasing power supply to the SMA wires 20. The following description provides specific application examples of the present invention, but it will be appreciated that the actuator assembly 1 need not be used in these particular applications.

In some embodiments, the actuator assembly 1 may be a micro-actuator for a camera or a mobile phone. The actuator assembly may, for example, be configured to provide optical image stabilization (OIS) or auto-focus (AF) in a camera apparatus. For these purposes, the actuator assembly may implement 3DOF or 2DOF movement (for OIS) or 1DOF movement (for AF), as described above in relation to the bearing arrangement 50.

There is thus provided a camera apparatus comprising the actuator assembly 1, an image sensor and a lens assembly comprising at least one element. One of an image sensor and the at least one lens element may be fixed relative to the movable part 20 and the other of the image sensor and the at least one lens element may be fixed relative to the support structure 10. Moving the movable part 20 relative to the support structure 10, upon contraction of the SMA wires 40, may thus effect relative movement between lens element and image sensor. Moving the lens element relative to the image sensor along an optical axis of the lens assembly may effect AF in the camera apparatus. Moving the lens element relative to the image sensor in directions perpendicular to the optical axis and/or rotating the image sensor may effect OIS in the camera apparatus.

Although not shown, actuator assemblies 1 that may effect OIS are described in WO 2013 175197 A1 or WO 2017 072525 A1, which are herein incorporated by reference. The present invention may be applied to these actuator assemblies 1. In this regard, the movable part 20 may be movable in a movement plane within the range of movement. The actuator assembly 1 may comprise a total of four SMA wires 40 connected between the movable part 20 and the support structure 10 in an arrangement wherein none of the SMA wires 40 are collinear, and wherein the SMA wires 40 are capable of being selectively driven to move the movable part 10 relative to the support structure to any position in said range of movement without applying any net torque to the movable part 20 around a primary axis perpendicular to the movement plane.

For example, two of the SMA wires 40 may be connected between the movable part 20 and the support structure 10 to each apply a torque to the movable part 20 in said movement plane around the primary axis in a first sense around the primary axis and the other two SMA wires 40 are connected between the movable part 20 and the support structure 10 to each apply a torque to the movable part in said movement plane around the primary axis in a second, opposite sense around the primary axis. The four SMA wires 40 may be arranged in a loop at different angular positions around the primary axis, successive SMA wires around the primary axis being connected to apply a force to the movable element in alternate senses around the primary axis.

Alternatively, the movable part 10 may comprise a camera module with both a lens assembly and an image sensor. Tilting the camera module, upon contraction of the SMA wires, is another way to achieve OIS.

FIGS. 4-6 describe in further detail specific embodiments of the actuator assembly 1, where the actuator assembly effects movement of the movable part 20 along a movement axis. These specific embodiments may be used to effect AF in a camera apparatus, for example.

Actuator Assembly for Translational AF

Figure 4A:
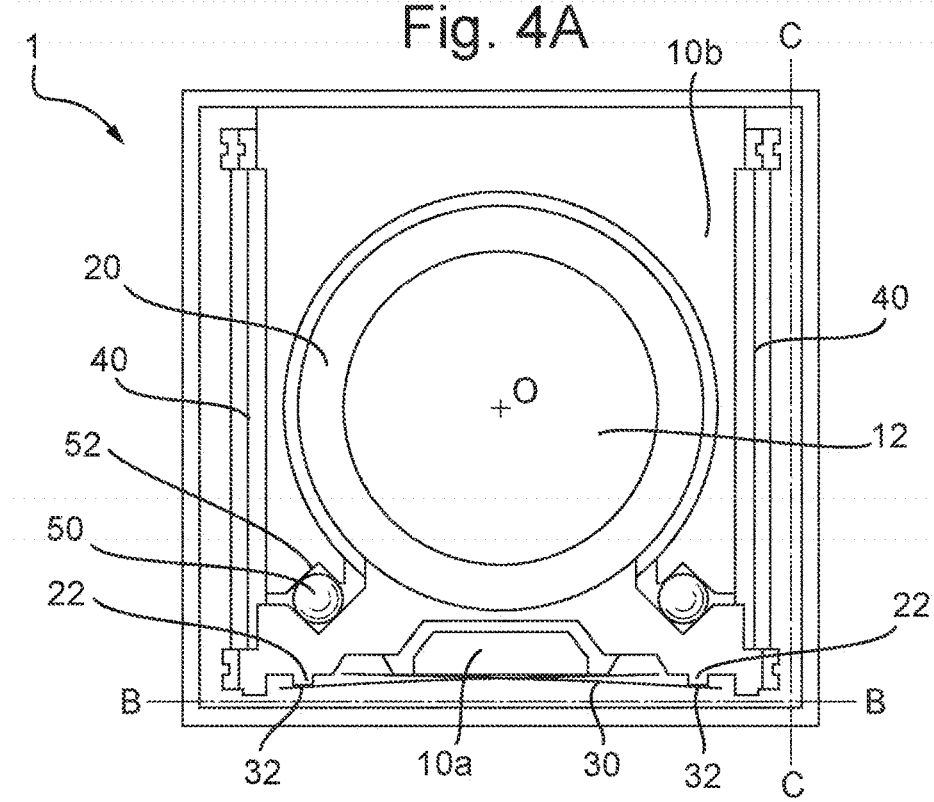
FIGS. 4A, 4B and 4C are schematic views of an actuator assembly according to an embodiment of the present invention.
Figure 4B:
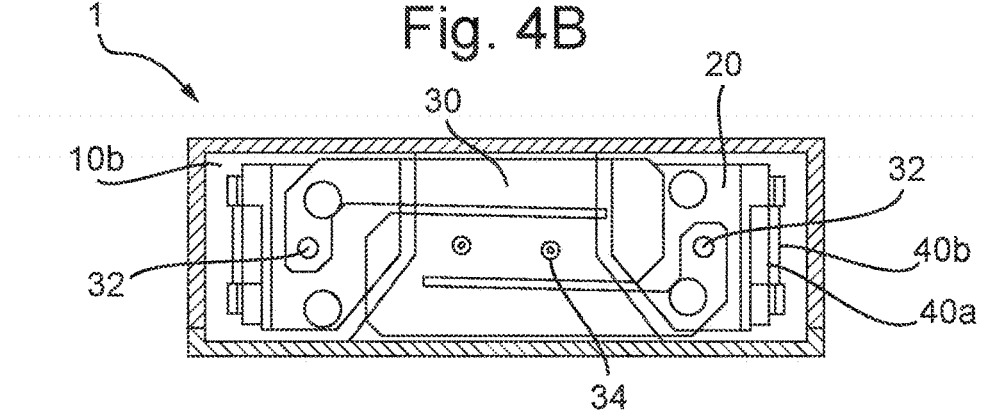
Figure 4C:
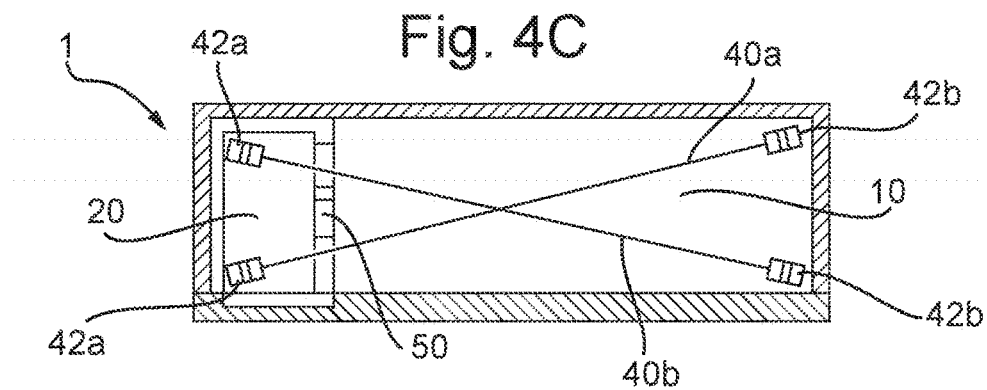

FIG. 4A is a plan view of an actuator assembly 1 according to an embodiment of the present invention. FIGS. 4B and 4C are side sectional views of the actuator assembly 1 across respective lines B-B and C-C of FIG. 4A.

The actuator assembly 1 comprises a support structure 10. An image sensor (not shown) is mounted on the support structure 10.

The support structure 10 may include a base, for example formed from a rigid plate. The support structure 10 also includes a chassis 10b and a flexure support 10a that protrude from the base and may be a moulded component.

The chassis 10b and the flexure support 10a are integrally formed with the base. The chassis 10b has a central aperture 12 aligned with the image sensor.

The actuator assembly 1 further comprises a movable part 20 in the form of a lens carriage 20, which holds at least one lens element. The lens element may be made of glass or plastic. The lens element has an optical axis O aligned with the image sensor and is arranged to focus an image on the image sensor. The lens carriage 20 also has a pair of protrusions 22 that are formed on one side protruding laterally of the optical axis O.

The actuator assembly 1 is a miniature optical device. In some examples of a miniature optical device, the lens may have a diameter of at most 30 mm, at most 20 mm, at most 15 mm, or at most 10 mm. In embodiments, the lens diameter may be between 5 mm and 10 mm.

Although the actuator assembly 1 in this example is a camera, that is not in general essential. In some examples, the actuator assembly 1 may be an optical device in which the movable part is a lens element but there is no image sensor. In other examples, actuator assembly 1 may be a type of apparatus that is not an optical device, and in which the movable element is not a lens element and there is no image sensor. In some examples, the actuator assembly 1 may be an optical device in which the movable part is a carriage supporting an image sensor where the lens carriage may be driven by another actuator, or not moveable at all.

The actuator assembly 1 also comprises bearing arrangement 50 comprising ball bearings positioned along a guide 52 that supports the lens carriage 20 on the support structure 10. The ball bearings and the guide are configured to guide movement of the lens carriage 20 with respect to the support structure 10 along the optical axis O, which is therefore the movement direction in this example, while constraining movement of the lens carriage 20 with respect to the support structure 10 in other degrees of freedom.

The actuator assembly 1 comprises two pairs of SMA wires 40, each having SMA wires 40a, 40b arranged at an angle to each other, as well as to the movement direction. In operation, the SMA wires 40a, 40b drive movement of the lens carriage 20 along the optical axis O. Each of the SMA wires 40 is connected, at a first end, to the support structure 10 by a static crimp portion 42a fixed at the sidewall of the chassis 10b. The static crimp portions 42 crimp the respective SMA wires 40 to provide both mechanical and electrical connection. The SMA wire 40 is also connected to the lens carriage 20 by moveable crimp portion 42b fixed thereon. As a result, each of the SMA wire 40 is connected at one end to the support structure 10 and at the other end to the lens carriage 20.

In the illustrated example, the two pairs of SMA wires 40 are arranged on opposite sides of the actuator assembly 1. Upon contraction, and referring to FIG. 4C, the SMA wires 40a drive the lens carriage 20 in the upward direction, whereby the SMA wires 40b drive the lens carriage in the opposite direction. The actuating forces by the SMA wires 40 also draw the lens carriage 20 towards, and therefore presses against, the respective sets of ball bearings 50. Advantageously, such an arrangement allows the actuating force from each pair of SMA wires to act directly against a respective set of ball bearings 50, and thereby reducing the amount of rattle between the lens carriage 20 and the chassis 10b.

In some other embodiments, a single pair of SMA wires 40 may be arranged on a side of the actuator assembly where the actuating force of the SMA wires each comprises a force component acting against the ball bearings so as to engage the lens carriage 20 with the chassis 10b.

The actuator assembly 1 further comprises a biasing arrangement 30 in the form of a planar flexure. The flexure is fixedly attached, at attaching points 34 towards the centre of the flexure, to the flexure support 10a. The flexure has two opposite free ends each forms a contact portion 32 for engaging the respective protrusion 22 at the lens carriage 20. More specifically, the arms of the flexure function as cantilevers having their contact portions 32 biased against the respective productions 22 to generate frictional forces for constraining free movement in the lens carriage 20.

The contact portions 32 of the flexure are positioned laterally to the guide 52 as shown in FIG. 4A. Therefore, the biasing force applied by the flexure may act directly against the guide 52 to retain the lens carriage 20 on the guide, even when the SMA wires are not energised.

As shown in the side view of FIG. 4B, the flexure has at least one hairpin-shaped, or kinked, portion in each of its arms, e.g. the flexure has a labyrinth feature. Advantageously, such an arrangement may allow longer flexure arms to be used and/or allow the flexure arms to be provided with different stiffnesses. In some other embodiment, the flexure may comprise only straight sections without the presence of kinked portions.

Generally, the biasing arrangement 30 and bearing arrangement 50 of FIG. 4 function in a manner similar to that shown in the schematic representation of FIG. 3C, except that the biasing arrangement 30 is comprised by the support structure 10. In some other embodiments, the biasing arrangement 30 (i.e. the flexure of FIG. 4) may instead be fixedly attached to the lens carriage 20, whereby the contact portions engage a surface of the support structure 10. In such embodiments, the flexure exerts a biasing force on the surface so as to generate frictional forces thereat. That is, the biasing arrangement 30 in such an embodiment arranged as in the schematic embodiment of FIG. 3C.

Figure 5A:
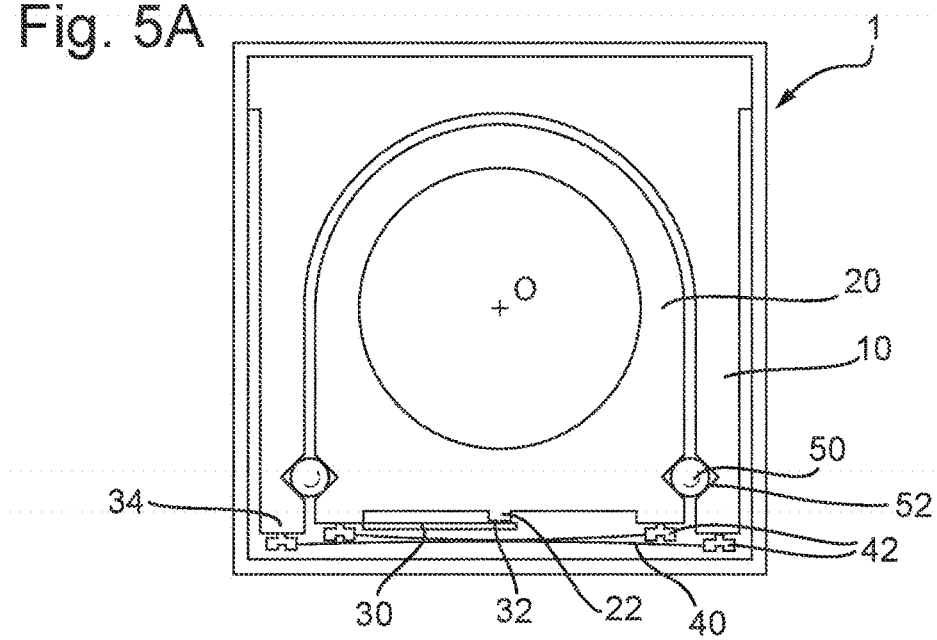
FIGS. 5A, 5B and 5C are schematic views of an actuator assembly according to another embodiment of the present invention.
Figure 5B:
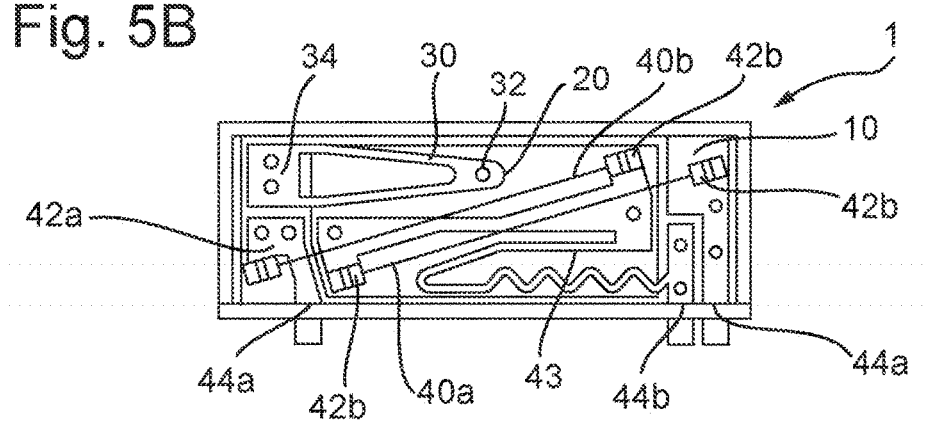
Figure 5C:
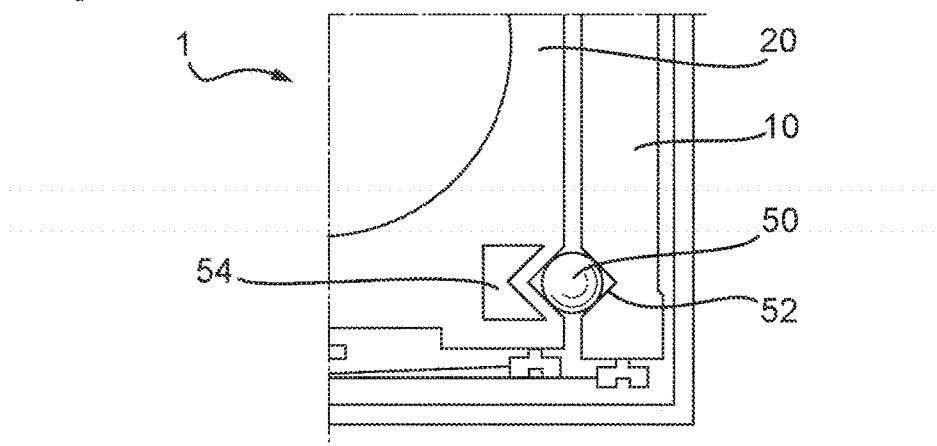

FIGS. 5A, 5B and 5C are respectively a plan view, a side sectional view and an enlarged plan view of another actuator assembly 1 according to another embodiment of the present invention. The actuator assembly 1 is functionally similar to the previous embodiment, and can be considered as another example of the schematic diagram as shown in FIG. 3C (except that the biasing arrangement 30 is part of the support structure 30, unlike in FIG. 3C).

Compared to the actuator assembly 1 of FIG. 4, the actuator assembly 1 of FIG. 5 comprises a bearing arrangement 50 having a ball bearing comprising guide 52 that shrouds the ball bearings 50. More specifically, corresponding grooves or races 52 are formed on both the support structure 10 and the lens carriage 20, with the ball bearings 50 placed within the races 52. The lens carriage 20 has a slightly undersized race so as to reduce clearance. With a nominal clearance set between the support structure 10 and lens carriage 20, the ball bearings 50 acts as a wedge that minimises lateral movement in the lens carriage 20. Therefore, in this embodiment, the lens carriage 20 no longer relies on the actuation force from the SMA wires 40, nor the biasing force from the flexure 30, in order to be supported on the support structure 10.

Since the clearance between the lens carriage 20 and the support structure 10 are manufactured to tight tolerances, in some cases the races 52 may be overly narrow so as to resist movement in the lens carriage 20. Therefore, in some embodiments, a relatively stiff compliance 54 could be built into the race 52 to overcome such issue, as shown in FIG. 5C.

As shown in FIGS. 5A and 5B, a pair of SMA wires 40a, 40b coextends on a side of the actuator assembly 1, in a direction angled to the direction of movement, e.g. along an optical axis O. More specifically, the SMA wires 40a, 40b each having one end connected to the support structure 10 by a fixed crimp 42a and another end connected to the moveable part 20 by a movable crimp 42b. With respect to SMA wire 40a, the fixed crimp 42a is positioned at a lower elevation than the moving crimp 40b. Therefore, on contraction, the SMA wire 42a draws the lens carriage 20 downwardly towards the support structure 10. On the other hand, with respect to SMA wire 40b, the fixed crimp 42a is positioned at a higher elevation than the moving crimp 40b. Therefore, on contraction, the SMA wire 42a draws the lens carriage 20 upwardly towards the support structure 10. Such a wiring arrangement is described in greater detail in WO 2019/243842A, which is incorporated herein by reference.

The fixed crimp 42a having an electrical connector 44a for forming an electrical connection with the control circuit. The moving crimps 42b, on the other hand, are part of a crimp plate 43 that provides a common electrical connection between the two SMA wires 40a,40b. The crimp plate 43 is connected with an electrical connector 44b by a spring, or a labyrinth path, for forming an electrical connection with the control circuit. The provision of the spring allows for relative movements between the moveable part 20 and the support structure 10, but does not apply any force on the moveable part 20. That is, the spring alone does not hold the lens carriage 20 in position when the SMA wires are not energised.

The actuator assembly 1 further comprises a planar flexure 30 fixedly attached, at attaching points 34 towards an end of the flexure 30, to the support structure 10. The flexure 30 having a free end forming a contact portions 32 for engaging the protrusion 22 of the lens carriage 20. More specifically, the flexure 30 functions as a cantilever having the contact portion 32 biased against the respective production 22 to generate frictional forces that constrains free movement in the lens carriage 20. Generally, the flexure 30 in the embodiment functions in a similar manner to that in the schematic representation of FIG. 3C.

The protrusion 22 spaces laterally from the centre of the lens carriage 20, and is positioned midway between the two bearing races 52 as shown in FIG. 5A. As a result, the ball bearings 50 in both bearing races 52 may react to the biasing force in an identical manner.

In some other embodiments, plural flexures each having a contact point may engage respective protrusions on the lens carriage, e.g. in a manner similar to the embodiment of FIGS. 4A to 4C. Since the lens carriage 20 does not require the actuating force from SMA wires 40 or the biasing force from the flexure 30 to stay engaged with the ball bearings 50, in this embodiment, the flexure 30 and/or the SMA wires 40 may be provided on any one of the quadrilateral sides of the actuator assembly 1. Moreover, the flexure and the SMA wires may be provided on different quadrilateral sides of the actuator assembly 1.

Generally, the frictional forces are sufficient to constrain free movement in the lens carriage 20, yet not significant enough to resist relative movement between the lens carriage 20 and the support structure 10 when the SMA wires 40 are energised. In some embodiments, one or both of the contact portion 32 or the protrusion 22 of the lens carriage may be provided with high friction material or means as described.

Actuator Assembly for Helical AF

The use of a biasing arrangement and friction surfaces for constraining free movement in a movable part 20 is not limited to actuator assembly 1 where a moveable part 20 only moves along a single axis. That is, the frictional forces may be suitable for constraining movements in two perpendicular directions. In some embodiments, the frictional forces may constraint free movement along a helical axis, as shown in the actuator assembly 1 in FIGS. 6A to 6F.

Figure 6A:
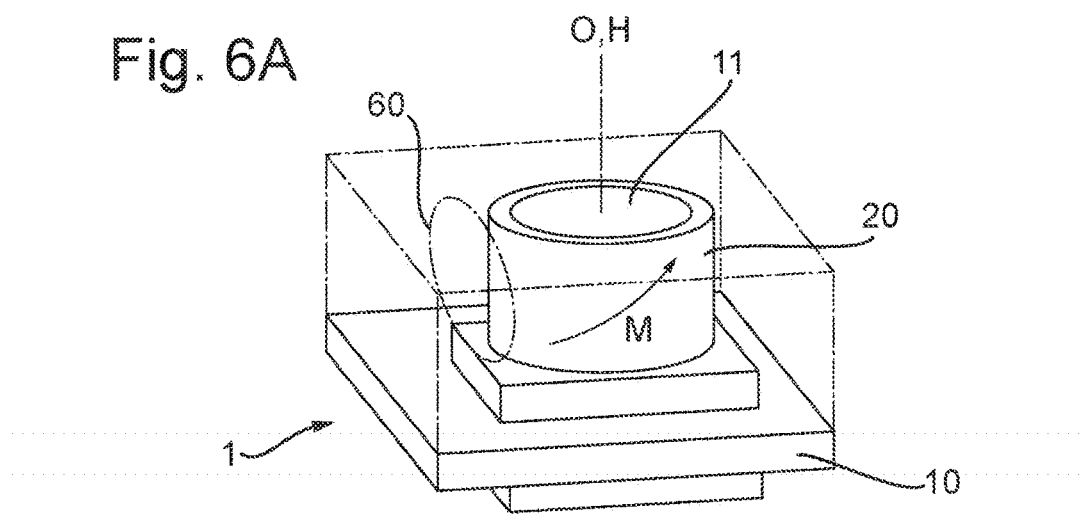
FIGS. 6A-6F are schematic views of an actuator assembly according to another embodiment of the present invention.
Figure 6B:
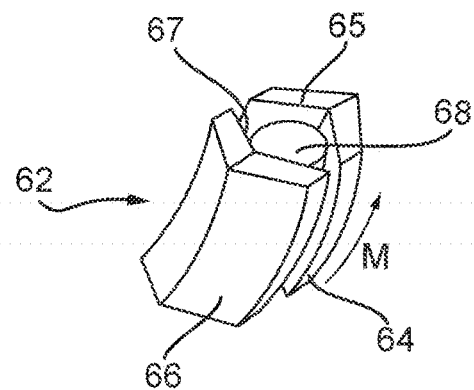
Figure 6C:
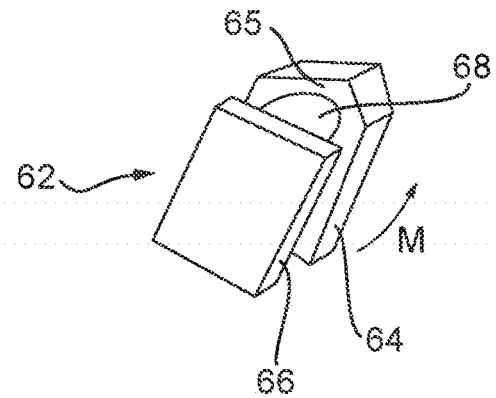
Figure 6D:
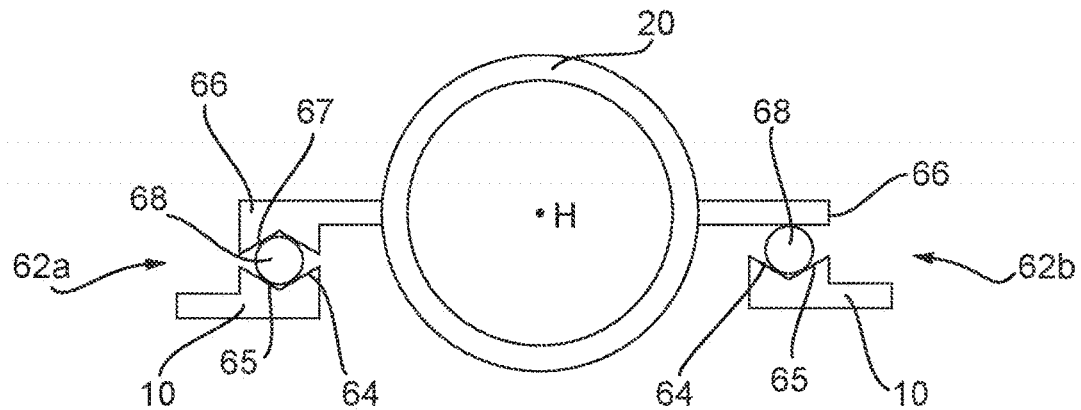

FIG. 6A is an illustration of an actuator assembly 1 according to another embodiment of the present invention. FIGS. 6B, 6C and 6D are respectively perspective views and a plan view of a helical bearing for the actuator assembly of FIG. 6A. Such an actuator assembly is described in WO 2019 243849 A1, which is herein incorporated by reference.

The actuator assembly 1 comprises a support structure 10 that has an image sensor mounted thereon. The actuator assembly 1 also comprises a helical bearing arrangement 60 (shown schematically in FIG. 4A) that supports a lens carriage 20 on the support structure 10. The lens carriage 20 comprises a lens 11 having an optical axis O. The helical bearing arrangement 60 is arranged to guide helical movement of the lens carriage 10 with respect to the support structure 10 around a helical axis H. The helical axis H in this example is coincident with the optical axis O and the helical movement is shown in FIG. 6A by the arrow M. Preferably, the helical motion is along a right helix, that is a helix with constant radius, but in general any helix is possible. The pitch of the helix may be constant or vary along the helical motion. Preferably, the helical movement is generally only a small portion (less than one quarter) of a full turn of the helix.

The helical motion of the lens carriage 20 guided by the helical bearing arrangement 60 includes a component of translational movement along the helical axis H and rotational movement around the helical axis H. The translational movement along the helical axis H is the desired movement of the lens carriage 20, for example to change the focus of the image on the image sensor and/or to change the magnification (zoom) of the image on the image sensor. The rotational movement around the helical axis H is in this example not needed for optical purposes, but is in general acceptable as rotation of the lens carriage 20 does not change the focus of the image on the image sensor.

The helical bearing arrangement 60 may take a variety of forms.

One possibility is that the helical bearing arrangement 60 comprises one or more helical bearings 62 that are rolling bearings, examples of which are shown in FIGS. 6B and 6C. In each of FIGS. 6B and 6C, the helical bearing 62 comprises a pair of bearing surfaces 64 and 66 and plural rolling bearing elements 68, for example balls, disposed between the bearing surfaces 64 and 66. One of the bearing surfaces 64 and 66 is provided on the support structure 10 and the other of the bearing surfaces 64 and 66 is provided on the lens carriage 20.

The helical bearing 62 guides the helical movement of the lens carriage 20 with respect to the support structure 10 as shown by the arrow M. This may be achieved by the bearing surfaces 64 and 66 extending helically around the helical axis H, that is following a line that is helical. That said, in practical embodiments, the length of the bearing surfaces 64 and 66 may be short compared to the distance of the bearing surfaces 64 and 66 from the helical axis H, such that their shape is close to straight or even each being straight, provided that the one or more helical bearings of the helical bearing arrangement 60 guide helical movement of the lens carriage 20 with respect to the support structure 10. Plural helical bearings 62 are typically present, located at different angular positions around the helical axis H, in which case the helical bearings 62 have different orientations so that they cooperate and maintain adequate constraints to guide the helical movement of the lens carriage 20 with respect to the support structure 10, even if the bearing surfaces 64 and 66 of an individual helical bearing 62 are straight.

In the example of FIG. 6B, the bearing surfaces 64 and 66 each comprise respective grooves 65 and 67 in which the rolling bearing elements 68 are seated. In this example, the grooves 65 and 67 constrain transverse translational movement of the lens carriage 20 with respect to the support structure 10, that is transverse to the direction of movement shown by arrow M. The grooves shown in FIG. 6B are V-shaped in cross-section, but other cross-sections are possible, for example curved as in portions of a circle or an oval. In general, the grooves 65 and 67 provide two points of contact with the respective rolling bearing elements 68. The grooves 65 and 67 may extend helically. Alternatively, in practical embodiments, the length of the bearing surfaces 64 and 66 may be short compared to the distance of the bearing surfaces 64 and 66 from the helical axis H, in which case the grooves 65 and 67 may be straight or close to straight, provided that the one or more helical bearings 62 of the helical bearing arrangement 60 guide helical movement of the lens carriage 20 with respect to the support structure 10.

In the example of FIG. 6C, a first bearing surface 64 comprises a groove 65 in which the rolling bearing elements 68 are seated and a second bearing surface 66 wherein the bearing surface is 'planar'. The first bearing surface 64 comprising a groove 65 may be provided on either one of the support structure 10 and the lens carriage 20, with the second bearing surface 66 being provided on the other one of the support structure 10 and the lens carriage 20. In the example of FIG. 6C, the helical bearing 62 does not constrain transverse translational movement of the lens carriage 20 with respect to the support structure 10, that is transverse to the direction of movement shown by arrow M. The bearing surface 66 is 'planar' in the sense that it is a surface which is not a groove and one which provides only a single point of contact with the ball. In other words, the bearing surface 66 is effectively planar across a scale of the width of the rolling bearing element 68, although be helical at a larger scale. For example, as pictured, the 'planar' surface is helical, being a line in cross section which twists helically along the movement direction, maintaining a single point of contact with the ball at any time. Alternatively and as mentioned above, in practical embodiments the length of the bearing surfaces 64 and 66 may be short, in which case the bearing surface 66 may be planar or close to planar, provided that the one or more helical bearings 62 of the helical bearing arrangement 66 guide helical movement of the lens carriage 20 with respect to the support structure 10.

A single rolling bearing element 68 is shown in FIGS. 6B and 6C by way of example, but in general may include any plural number of rolling bearing elements 68.

FIG. 6D illustrates a possible helical bearing arrangement that includes two helical bearings 62a and 62b only. The helical bearings 62a and 62b are arranged on opposite sides of the lens carriage 20.

The first helical bearing 62a is of the same type as the helical bearing 62 shown in FIG. 6B wherein the bearing surfaces 64 and 66 each comprise respective grooves 65 and 67. The first helical bearing 62a includes plural rolling bearing elements 68 to constrain the relative movement of the lens carriage 20 and the support structure 10.

The second helical bearing 62b is of the same type as the helical bearing 62 shown in FIG. 6C wherein the first bearing surface 64 comprises a groove 65 in which the rolling bearing elements 68 are seated and the second bearing surface 66 is planar.

FIG. 6C illustrates the case that the first bearing surface 64 of the second helical bearing 62b is on the support structure 10, but it could alternatively be on the lens carriage 20. The second helical bearing 62b may comprise a single rolling bearing element 68 or plural rolling elements 68 and principally adds a constraint against relative rotation of the lens carriage 20 and the support structure 10 around the direction of movement (arrow M) of the first helical bearing 62a.

Figure 6E:
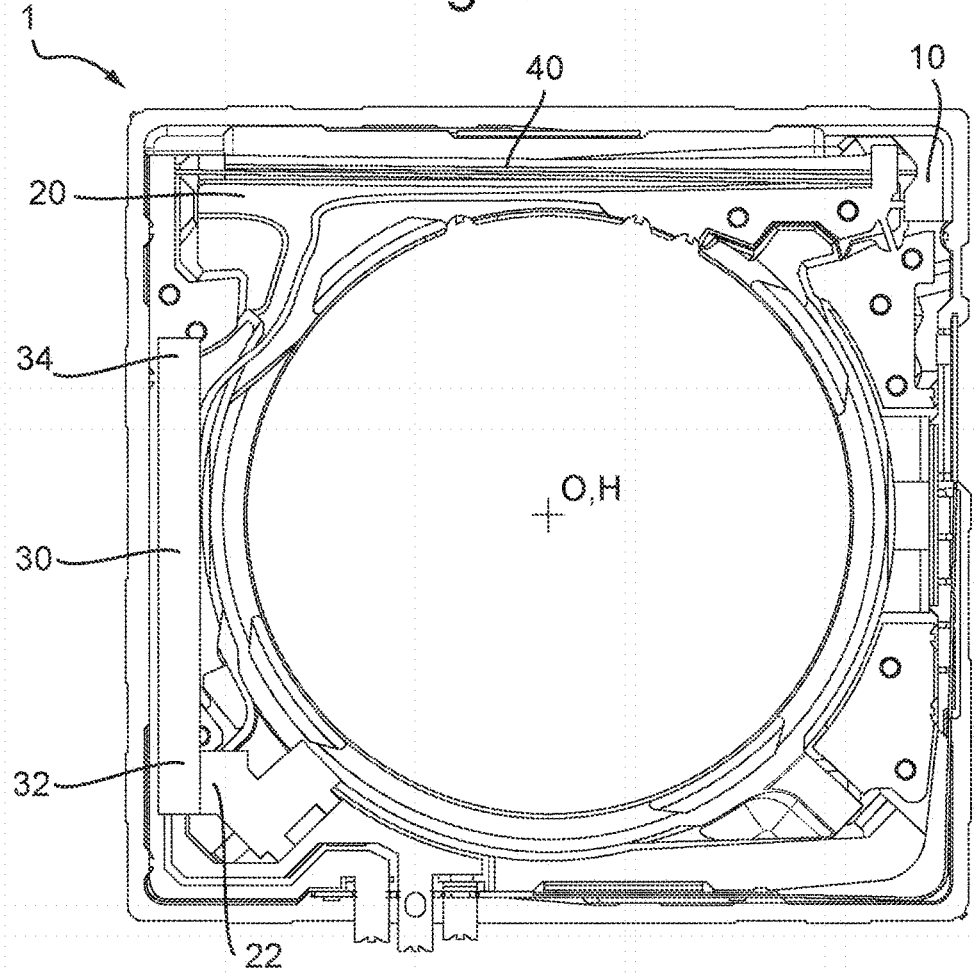
Figure 6F:
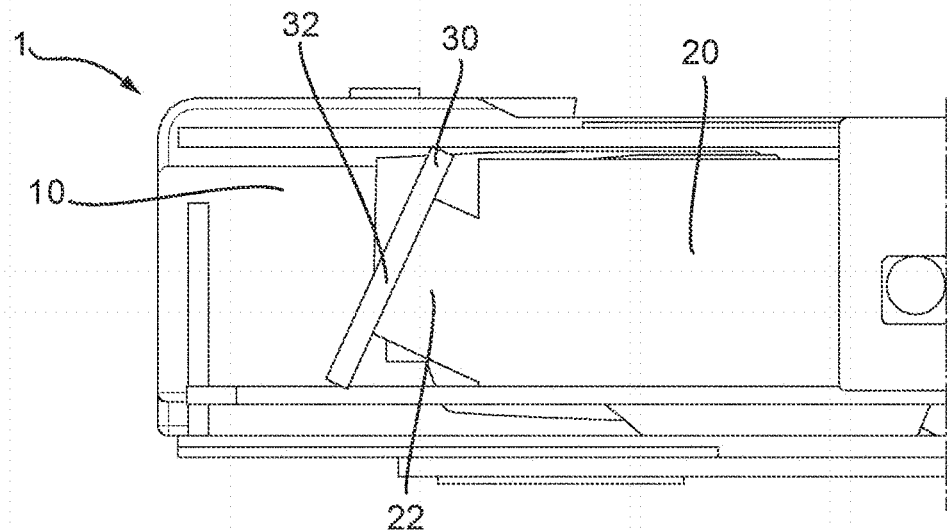

FIGS. 6E and 6F are respectively a plan view and an enlarged side view of a helical bearing for the actuator assembly 1 of FIG. 6A. The actuator assembly 1 having the lens carriage 20 supported on the support structure 10 by the helical bearing arrangement 60 shown in FIG. 6D. The actuator assembly 1 further comprises a pair of SMA wires 40 connected, substantially in parallel, between the support structure 10 and the lens carriage 20. The pair of SMA wires 40 are arranged such that energising one of the SMA wires 40 causes the lens carriage 20 to rotate around the helical axis H (e.g. along a helical path) in one direction, whilst energising the other one of the SMA wires 40 causes the lens carriage 20 to rotate around the helical axis H (e.g. along a helical path) in an opposite direction. By the helical bearing arrangement 60, the lens carriage 20 may traverse along the helical axis (or optical axis) for effecting autofocus and zoom.

The actuator assembly further comprises a biasing arrangement 30, in the form of a planar flexure 30, fixedly attached to the support structure 10. The flexure 30 is attached to a sidewall of the support structure 10 at attaching point 34, wherein the free end of the flexure 30 forms a contact portion 32 for engaging a protrusion 22 at the lens carriage 20.

More specifically, the flexure 30 functions as a cantilever having the contact portion 32 biased against the respective protrusion 22 to generate frictional forces that constraints free movement in the lens carriage 20. Generally, the flexure 30 in the third embodiment functions in a similar manner to that in the schematic representation of FIG. 2B.

The protrusion 22 spaces laterally from the centre of the lens carriage 20, and angles to the helical axis as shown in FIG. 6E. That is, the surface of the protrusion 22, as well as the contact portion 32 of the flexure 30 is arranged substantially normal to said helical path. Advantageously, such an arrangement may provide a consistent frictional force between the contact portion 32 and the protrusion over the full range of movement in the lens carriage 20.

Generally, the frictional forces are sufficient to constrain free movement in the lens carriage 20, yet not significant enough to resist relative movement between the lens carriage 20 and the support structure 10 when the SMA wires 40 are energised. In some embodiments, one or both of the contact portion 32 or the protrusion 22 of the lens carriage may be provided with high friction material as described.

In some other embodiments, the flexure may instead be fixedly attached to the lens carriage, whereby the contact portion engages a surface of the support structure. In such embodiments, the flexure exerts a biasing force on the surface so as to generate frictional forces thereat. That is, the flexure in these embodiments are inversed in comparison to the embodiment of FIG. 6E, and functions similarly to the schematic representation of FIG. 2A.

CLOSING PARAGRAPHS

The term 'shape memory alloy (SMA) wire' may refer to any element comprising SMA. The SMA wire may have any shape that is suitable for the purposes described herein. The SMA wire may be elongate and may have a round cross-section or any other shape cross-section. The cross-section may vary along the length of the SMA wire. It is also possible that the length of the SMA wire (however defined) may be similar to one or more of its other dimensions. The SMA wire may be pliant or, in other words, flexible. In some examples, when connected in a straight line between two elements, the SMA wire can apply only a tensile force which urges the two elements together. In other examples, the SMA wire may be bent around an element and can apply a force to the element as the SMA wire tends to straighten under tension. The SMA wire may be beam-like or rigid and may be able to apply different (e.g. non-tensile) forces to elements. The SMA wire may or may not include material(s) and/or component(s) that are not SMA. For example, the SMA wire may comprise a core of SMA and a coating of non-SMA material. Unless the context requires otherwise, the term 'SMA wire' may refer to any configuration of SMA wire acting as a single actuating element which, for example, can be individually controlled to produce a force on an element. For example, the SMA wire may comprise two or more portions of SMA wire that are arranged mechanically in parallel and/or in series. In some arrangements, the SMA wire may be part of a larger piece of SMA wire. Such a larger piece of SMA wire might comprise two or more parts that are individually controllable, thereby forming two or more SMA wires.

The SMA wires may be formed of any suitable shape memory alloy material, typically a nickel-titanium alloy (e.g. Nitinol), possibly also containing tertiary components such as copper. The SMA wires may have any cross-sectional profile and diameter suitable for the application. For example, the SMA wires may have a cross-section diameter of 25 µm, or 30 µm, or 35 µm, capable of generating a maximum force of between 120 mN to 400 mN whilst maintaining the strain in the SMA wire within safe limits (e.g. 2-3% reduction in length over original length). Increasing the diameter of each SMA wire from 25 µm to 35 µm approximately doubles the cross-sectional area of the SMA wire and thus approximately doubles the force provided by each SMA wire.

The invention claimed is:

1. An actuator assembly comprising:
   a support structure comprising a first friction surface;
   a movable part comprising a second friction surface engaging the first friction surface;
   one or more shape memory alloy, SMA, wires arranged, on contraction, to move the movable part relative to the support structure to any position within a range of movement;
   a biasing arrangement arranged to bias the first and second friction surfaces against each other with a normal force, thereby generating a static frictional force that constrains the movement of the movable part relative to the support structure at any position within the range of movement when the one or more SMA wires are not contracted,
   wherein the one or more SMA wires are arranged such that the normal force between the first and second friction surfaces remains substantially constant on contraction of the one or more SMA wires.

2. An actuator assembly according to claim 1, wherein the biasing arrangement is arranged to apply a biasing force in a direction perpendicular to the range of movement.

3. An actuator assembly according to claim 1, wherein the biasing arrangement is connected between the support structure and the movable part.

4. An actuator assembly according to claim 1, wherein the biasing arrangement is comprised by the movable part or by the support structure, such that the biasing arrangement moves with the movable part relative to the support structure or remains static relative to the support structure.

5. An actuator assembly according to claim 1, wherein the biasing arrangement comprises one or more flexures.

6. An actuator assembly according to claim 1, wherein the biasing arrangement comprises a magnet on one of the movable part and support structure, and a magnet or ferromagnetic material on the other of the movable part and support structure.

7. An actuator assembly according to claim 1, wherein the ratio of the static frictional force to the weight of the movable part is greater than 1.

8. An actuator assembly according to claim 1, wherein the actuator assembly comprises a bearing arrangement for bearing movement of the movable part relative to the support structure.

9. An actuator assembly according to claim 8, wherein the bearing arrangement constrains movement of the movable part relative to the support structure to movement in three degrees of freedom.

10. An actuator assembly according to claim 8, wherein the bearing arrangement constrains movement of the movable part relative to the support structure to movement in a movement plane.

11. An actuator assembly according to claim 8, wherein the bearing arrangement constrains movement of the movable part relative to the support structure to movement in one degree of freedom.

12. An actuator assembly according to claim 11, wherein the bearing arrangement constrains movement of the movable part relative to the support structure to helical movement about a helical axis.

13. An actuator assembly according to claim 11, wherein the bearing arrangement constrains movement of the movable part relative to the support structure to translational movement along a movement axis or rotational movement about a rotation axis.

14. An actuator assembly according to claim 8, wherein the bearing arrangement comprises a rolling bearing, the rolling bearing comprising a support bearing surface on the support structure, a movable bearing surface on the movable part and a rolling bearing element arranged between the support bearing surface and the movable bearing surface.

15. An actuator assembly according to claim 14, wherein the support bearing surface and movable bearing surface are parallel to the first and second friction surfaces.

16. An actuator assembly according to claim 8, wherein the bearing arrangement comprises a plain bearing formed between an engaging surface on the support structure in engagement with a corresponding engaging surface on the movable part.

17. An actuator assembly according to claim 16, wherein the plain bearing is formed between the first and second friction surfaces.

18. An actuator assembly according to claim 1, wherein the one or more SMA wires are arranged, on contraction, to apply actuating forces to the movable part relative to the support structure that are parallel to the first and second friction surfaces.

19. An actuator assembly according to claim 18, wherein the one or more SMA wires comprise two or more SMA wires and the SMA wires are angled with respect to the first and second friction surfaces in equal and opposite ways, such that stresses in the SMA wires perpendicular to the first and second friction surfaces cancel out and stresses in the SMA wires parallel to the first and second friction surfaces move the movable part relative to the support structure.

20. An actuator assembly according to claim 1, wherein the one or more SMA wires are angled with respect to one or more directions of movement of the movable part relative to the support structure.

* * * * *